US011746871B2

(12) United States Patent
Weston et al.

(10) Patent No.: US 11,746,871 B2
(45) Date of Patent: Sep. 5, 2023

(54) TORQUE STEER MITIGATION EMPLOYING A LIMITED SLIP DIFFERENTIAL ON A STEERING AXLE

(71) Applicant: Ford Global Technologies, LLC, Dearborn, MI (US)

(72) Inventors: Keith Weston, Canton, MI (US); Jonathan Michael Graves, Brighton, MI (US); Andrew Monticello, Farmington Hills, MI (US); Brent Clark, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 17/178,148

(22) Filed: Feb. 17, 2021

(65) Prior Publication Data
US 2022/0260145 A1   Aug. 18, 2022

(51) Int. Cl.
| F16H 48/22 | (2006.01) |
| F16H 48/08 | (2006.01) |
| F16H 48/34 | (2012.01) |
| F16H 48/20 | (2012.01) |

(52) U.S. Cl.
CPC ............ *F16H 48/22* (2013.01); *F16H 48/08* (2013.01); *F16H 48/34* (2013.01); *F16H 2048/087* (2013.01); *F16H 2048/205* (2013.01); *F16H 2048/346* (2013.01)

(58) Field of Classification Search
CPC ............ B60W 10/16; B60W 2510/12; B60W 2510/207; B60W 2520/14; B60W 2520/28; B60W 2520/406; B60W 2710/12; B60K 2023/043; F16H 48/22; F16H 48/36; F16H 2048/343; F16H 2048/346; F16H 2048/364–368
See application file for complete search history.

(56) References Cited

U.S. PATENT DOCUMENTS

| 7,395,142 B2 * | 7/2008 | Mori ................. B60W 30/02 180/443 |
| 7,793,750 B2 | 9/2010 | Ushiroda et al. |
| 8,239,097 B2 | 8/2012 | Yasui et al. |
| 9,199,640 B2 | 12/2015 | Weston et al. |
| 10,288,160 B2 * | 5/2019 | Guarino ................. F16H 48/22 |
| 10,596,902 B2 * | 3/2020 | Lim ................. B60K 23/0808 |
| 2019/0383379 A1 | 12/2019 | Chu |
| 2021/0323402 A1 * | 10/2021 | Stock ................. B60K 17/348 |

FOREIGN PATENT DOCUMENTS

EP          1854654 A1 *  11/2007  ............ B60K 17/20

* cited by examiner

*Primary Examiner* — Ernesto A Suarez
*Assistant Examiner* — James J Taylor, II
(74) *Attorney, Agent, or Firm* — Burris Law, PLLC

(57) ABSTRACT

A method for mitigating torque steer in a vehicle having a steering axle with a limited slip differential and a pair of output members. The limited slip differential includes a pair of differential outputs and a clutch. The method includes: operating the limited slip differential with the clutch in the first condition; determining that the vehicle is in a state in which a torque steer condition is occurring or is likely to occur; and operating the clutch to reduce a torque differential between the differential outputs to mitigate the torque steer condition. A vehicle with a steering axle and a controller that is configured to operate a clutch in the steering axle to attenuate torque steer is also provided.

14 Claims, 3 Drawing Sheets

TORQUE STEER MITIGATION EMPLOYING A LIMITED SLIP DIFFERENTIAL ON A STEERING AXLE

FIELD

The present disclosure relates to torque steer mitigation that employs a limited slip differential on a steering axle.

BACKGROUND

This section provides background information related to the present disclosure which is not necessarily prior art.

Some four-wheel drive and/or all-wheel drive vehicles experience torque steer under some circumstances where more drive torque is transmitted to the drive wheels on a steering axle and relatively more torque is transmitted between one of the drive wheels on the steering axle and the ground than is transmitted between the other one of the drive wheels on the steering axle and the ground. It would be desirable to provide a steering axle and related controls that can attenuate torque steer.

SUMMARY

This section provides a general summary of the disclosure, and is not a comprehensive disclosure of its full scope or all of its features.

In one form, the present disclosure provides a method for mitigating torque steer in a vehicle having a steering axle. The steering axle has a limited slip differential and a pair of output members. The limited slip differential includes a pair of differential outputs and a clutch. Each of the differential outputs is coupled to a respective one of the output members for common rotation. The clutch is selectively operable between a first condition, which permits speed differentiation between the differential outputs to a predetermined maximum extent and inhibits speed differentiation between the differential outputs to a predetermined minimum extent, and a second condition, which permits speed differentiation between the differential outputs to a predetermined minimum extent and inhibits speed differentiation between the differential outputs to a predetermined maximum extent. The method includes: operating the limited slip differential with the clutch in the first condition; determining that the vehicle is in a state in which a torque steer condition is occurring or is likely to occur; and operating the clutch to reduce a torque differential between the differential outputs to mitigate the torque steer condition.

In another form, the present disclosure provides a method for assisting a vehicle operator to perform a drifting maneuver in a vehicle. The vehicle includes a steering axle having a limited slip differential and a pair of output members. The limited slip differential includes a pair of differential outputs and a clutch. Each of the differential outputs is coupled to a respective one of the output members for common rotation. The clutch is selectively operable between a first condition, which permits speed differentiation between the differential outputs to a predetermined maximum extent and inhibits speed differentiation between the differential outputs to a predetermined minimum extent, and a second condition, which permits speed differentiation between the differential outputs to a predetermined minimum extent and inhibits speed differentiation between the differential outputs to a predetermined maximum extent. The method includes: determining a value of a characteristic that is indicative of a yaw angle; determining that the drifting maneuver has been initiated; operating the clutch in the second condition if the value of the characteristic indicates that an absolute value of the yaw angle exceeds a first predetermined threshold and the drifting maneuver has been initiated, or otherwise operating the clutch in an intermediate condition if the value of the characteristic indicates that the absolute value of the yaw angle does not exceed the first predetermined threshold, wherein the intermediate condition inhibits speed differentiation between the differential outputs to a predetermined first intermediate extent that is between the maximum and minimum extents to which speed differentiation is inhibited.

In a further form, the present disclosure provides a vehicle that includes a steering axle and a controller. The steering axle has a limited slip differential with a pair of differential output members and a clutch. The clutch is selectively operable between a first condition, which permits speed differentiation between the differential outputs to a predetermined maximum extent and inhibits speed differentiation between the differential outputs to a predetermined minimum extent, and a second condition, which permits speed differentiation between the differential outputs to a predetermined minimum extent and inhibits speed differentiation between the differential outputs to a predetermined maximum extent. The controller is coupled to the clutch and is configured to: operate the clutch in the first condition; determine that the vehicle is in a state in which a torque steer condition is occurring or is likely to occur; and operate the clutch to reduce a torque differential between the differential outputs to mitigate the torque steer condition.

In still another form, the present disclosure provides a vehicle with a steering axle and a controller. The steering axle has a limited slip differential with a pair of differential output members and a clutch. The clutch is selectively operable between a first condition, which permits speed differentiation between the differential outputs to a predetermined maximum extent and inhibits speed differentiation between the differential outputs to a predetermined minimum extent, and a second condition, which permits speed differentiation between the differential outputs to a predetermined minimum extent and inhibits speed differentiation between the differential outputs to a predetermined maximum extent. The controller is coupled to the clutch and is configured to: determine a value of a characteristic that is indicative of a yaw angle; determine that a drifting maneuver has been initiated; operate the clutch in the second condition if the value of the characteristic indicates that an absolute value of the yaw angle exceeds a first predetermined threshold and the drifting maneuver has been initiated, or otherwise operating the clutch in an intermediate condition if the value of the characteristic indicates that the absolute value of the yaw angle does not exceed the first predetermined threshold, wherein the intermediate condition inhibits speed differentiation between the differential outputs to a predetermined first intermediate extent that is between the maximum and minimum extents to which speed differentiation is inhibited.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
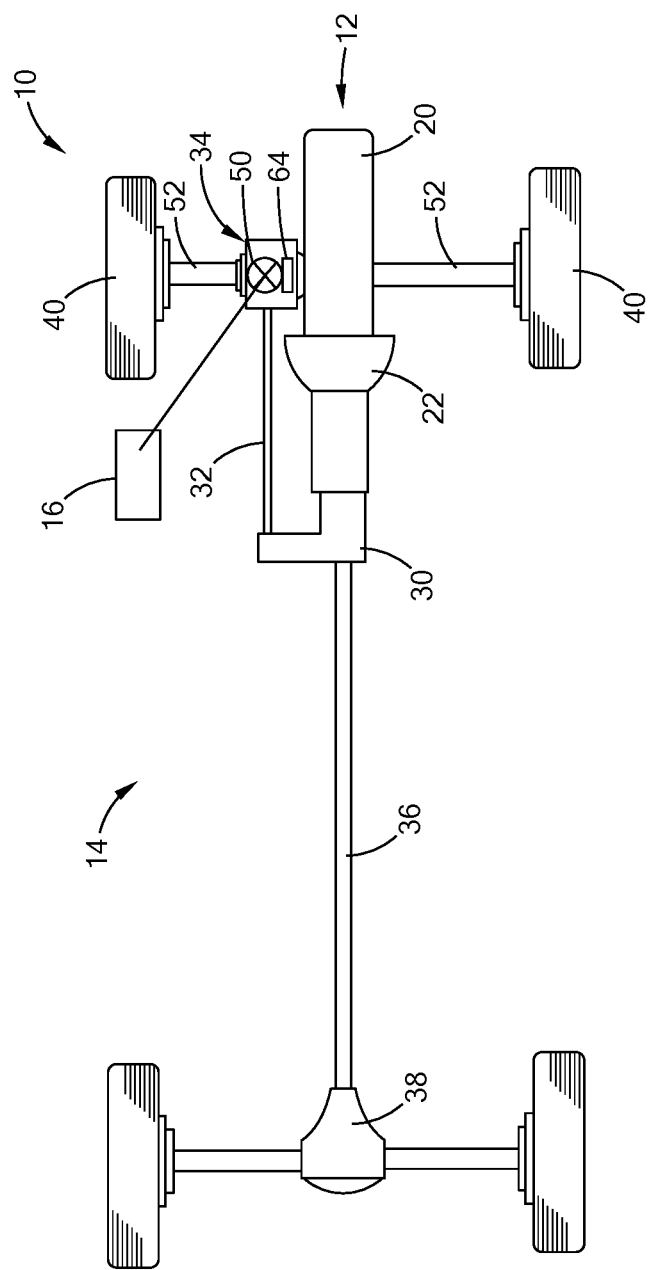
FIG. 1 is a schematic illustration of an exemplary vehicle having a steering axle and a controller that are configured to mitigate torque steer in accordance with the teachings of the present disclosure.

With reference to FIG. 1 of the drawings, an exemplary vehicle is schematically illustrated and is generally indicated by reference numeral 10. The vehicle 10 include a powertrain 12, a drive train 14 and a controller 16. The powertrain 12 can comprise a prime mover, such as an internal combustion engine 20, and a transmission 22. It will be appreciated, however, that the prime mover could comprise an electric motor (not shown) in addition to in or lieu of the internal combustion engine 20.

The drive train 14 can include a transfer case 30, a first propshaft 32, a first axle 34, a second propshaft 36, and a second axle 38. The transfer case 30 is conventionally configured to receive rotary power from the powertrain 12. The transfer case 30 is operable in at least one four-wheel or all-wheel drive mode in which the transfer case 30 transmits rotary power from the powertrain 12 to both the first and second axles 34 and 38 via the first and second propshafts 32 and 36, respectfully. The transfer case 30 can also be operable in a two-wheel drive mode in which the transfer case 30 transmits rotary power from the powertrain 12 to only the second axle 38 (via the second propshaft 36). The first propshaft 32 is configured to transmit rotary power between the transfer case 30 and the first axle 34. The first axle 34 is a steering axle that is configured to transmit rotary power to a pair of first vehicle wheels 40 while permitting the first vehicle wheels 40 to be pivoted by a steering system (not shown) relative to the drive train 14 to steer the vehicle 10.

Figure 2:
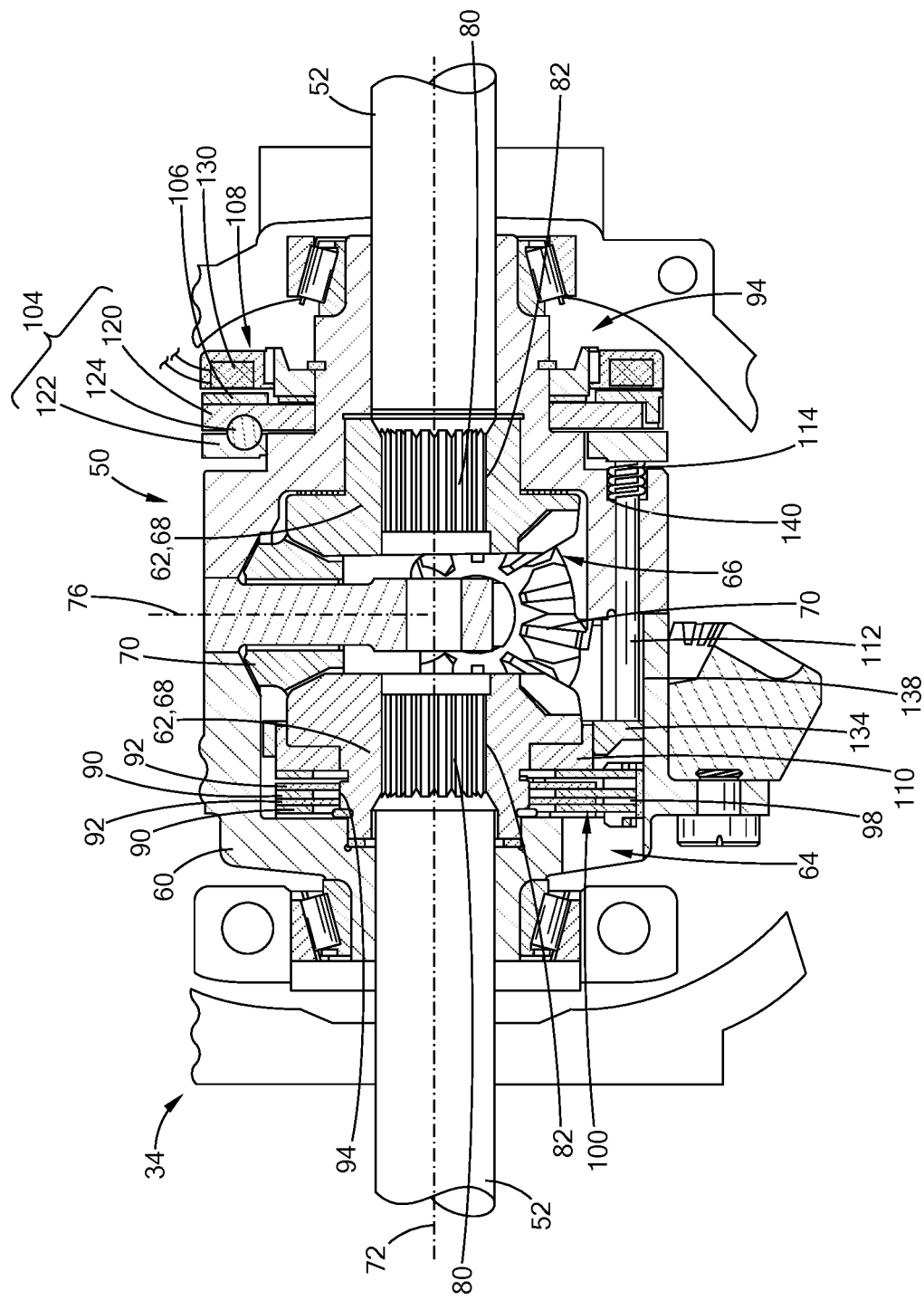
FIG. 2 is a section view of a portion of the steering axle depicted in FIG. 1.

With reference to FIG. 2, the first axle 34 includes a limited slip differential 50 and a pair of output members 52. The limited slip differential 50 can include a differential input 60, a pair of differential outputs 62 and a clutch 64. In the particular example provided, the differential input 60 is a differential case, and the limited slip differential 50 includes a differential gearset 66 that is received in the differential case. The differential gearset 66 has a pair of side gears 68, which are the differential outputs 62, and a plurality of differential pinions 70. The side gears 68 are rotatable relative to the differential case about the rotational axis 72 of the differential case. The differential pinions 70 are conventionally mounted to the differential case (differential input 60) for rotation about respective differential pinion axes 76 and are meshingly engaged with the side gears 68. Each of the output members 52 is coupled to an associated one of the differential outputs 62 and to an associated one of the first vehicle wheels 40 (FIG. 1) for common or joint rotation. In the particular example provided, each output member 52 has a male splined segment 80 that is engaged to a female splined section 82 formed on a corresponding one of the side gears 68.

The clutch 64 can be selectively operated between a first condition, which permits speed differentiation between the differential outputs 62 to a predetermined maximum extent and inhibits speed differentiation between the differential outputs 62 to a predetermined minimum extent, and a second condition, which permits speed differentiation between the differential outputs 62 to a predetermined minimum extent and inhibits speed differentiation between the differential outputs 62 to a predetermined maximum extent. Any type of clutch may be employed, but in the particular example provided, the clutch 64 includes a plurality of first friction plates 90, a plurality of second friction plates 92, and a clutch actuator 94. Each of the first friction plates 90 is axially slidably but non-rotatably coupled to one of the side gears 68. In the example provided, the first friction plates 90 have an annular shape and define a toothed internal aperture (not specifically shown) that is engaged to an externally splined segment 96 formed on the one of the side gears 68. Each of the second friction plates 92 is non-rotatably but axially slidably coupled to the differential input 60. In the example provided, the second friction plates 92 have an annular shape with an externally toothed outer perimeter (not specifically shown) that is engaged with an internally toothed aperture 98 in the differential case (differential input 60) that is disposed concentrically about the externally splined segment 96 on the one of the side gears 68. The first and second friction plates 90 and 92 are interleaved with one another and form a clutch pack 100.

The clutch actuator 94 can be any type of electric, mechanical, hydraulic or pneumatic actuator that is configured to apply a compressive force to the clutch pack 100 to frictionally engage the first and second friction plates 90 and 92 to one another. In the example provided, the clutch actuator 94 comprises a ball-ramp mechanism 104, an armature 106, an electromagnet 108, a pressure plate 110, a plurality of pins 112 (only one shown), and a plurality of springs 114 (only one shown).

The ball-ramp mechanism 104 conventionally includes a first ball-ramp ring 120, a second ball-ramp ring 122 and a plurality of balls 124 that are received between the first and second ball-ramp rings 120 and 122 in tapered ball tracks (not specifically shown). The first and second ball-ramp rings 120 and 122 are rotatably received on the differential case (differential input 60). The second ball-ramp ring 122 is axially movable along the rotational axis 72 of the differential case (differential input 60). The armature 106 is an annular structure that is formed of a ferromagnetic material and is fixedly coupled to the first ball-ramp ring 120 such that the armature 106 is disposed between the first ball-ramp ring 120 and the electromagnet 108. The electromagnet 108 has an annular coil 130 and is mounted concentrically about the differential case (differential input 60). The annular coil 130 is electrically coupled to the controller 16. The controller 16 can selectively provide electric power to the annular coil 130. The pressure plate 110 is disposed between the clutch pack 100 and a shoulder 134 on the side gear 68 and is movable along the rotational axis 72. Each of the pins 112 is received in a hole 138 that is formed laterally through the differential case (differential input 60) and abut the pressure plate 110. Each of the springs 114 is disposed about a corresponding one of the pins 112 and is received axially between a shoulder 140 on the differential case (differential input 60) and the second ball-ramp ring 122.

When electric power is not provided by the controller 16 to the annular coil 130, the springs 114 create a drag on the second ball-ramp ring 122 that tends to cause relative rotation between the first and second ball-ramp rings 120 and 122 that causes alignment of the deepest parts of the ball tracks to the balls 124 so that the second ball-ramp ring 122 is relatively close to the first ball-ramp ring 120. In this (first)

condition, speed differentiation between the differential outputs 62 is permitted to a maximum extent and the clutch 64 inhibits speed differentiation between the differential outputs 62 to a predetermined minimum extent. Depending on the length of the pins 112, and the spring rate of the springs 114, the clutch actuator 94 could be configured to provide no pre-load to the clutch pack 100 so that the limited slip differential 50 operates as an open differential, or with a predetermined amount of preload so that a first predetermined torque differential between the torque that is output through the differential outputs 62 is needed before speed differentiation is permitted.

The controller 16 can operate the annular coil 130 to create a magnetic field that is employed to place a rotational drag on the first ball-ramp ring 120. The rotational drag on the first ball-ramp ring 120 can slow the rotational speed of the first ball-ramp ring 120 relative to the rotational speed of the second ball-ramp ring 122, causing relative rotation between the first and second ball-ramp rings 120 and 122, which due to the taper of the ball tracks, causes the second ball-ramp ring 122 to move along the rotational axis 72 in a direction away from the first ball-ramp ring 120. Movement of the second ball-ramp ring 122 to its fullest extent away from the first ball-ramp ring 120 operates the clutch 64 in a (second) condition that permits speed differentiation between the differential outputs 62 to a predetermined minimum extent and inhibits speed differentiation between the differential outputs 62 to a predetermined maximum extent. In this regard, a second, higher magnitude predetermined torque differential between the torque that is output through the differential outputs 62 is needed before the limited slip differential 50 will permit speed differentiation between the differential outputs 62.

Figure 3:
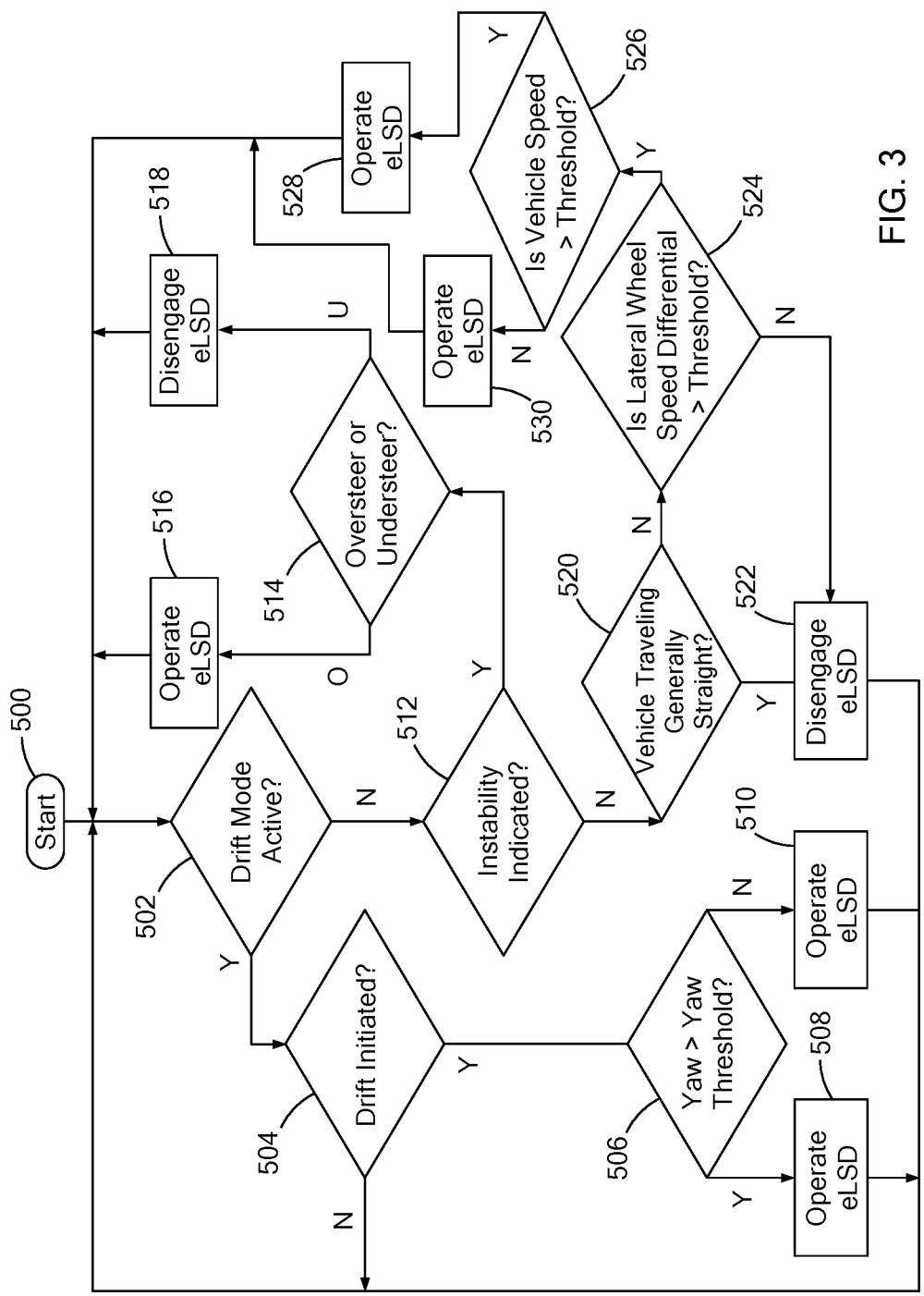
FIG. 3 is a schematic view in flowchart form of an exemplary method for operating the steering axle performed in accordance with the teachings of the present disclosure.

With reference to FIGS. 1 and 3, the controller 16 can be configured to operate the clutch 64 of the limited slip differential 50 to mitigate torque steer and/or to aid a vehicle operator in operating the vehicle 10 to perform a drift maneuver. A drift maneuver is a situation in which the vehicle operator intentionally oversteers, with a loss of traction, while maintaining control and driving the vehicle 10 through the entirety of a corner. Oversteer is what occurs when the vehicle 10 turns by more than the amount commanded by the vehicle operator through a steering wheel, while understeer is what occurs when the vehicle 10 turns less than the amount commanded by the vehicle operator through the steering wheel.

Control can begin at bubble 500 and can proceed to decision block 502 where control can determine if a drift mode (i.e., a mode of operation of the vehicle 10 that is configured to aid the vehicle operator to perform a drift maneuver) is active. Activation of the drift mode can be accomplished through the transmission of a signal to the controller 16 that is generated by a switch or graphical user interface, for example. If control determines that the drift mode has been activated, control proceeds to decision block 504.

In decision block 504, control determines if a drift maneuver has been initiated. Control can determine if a drift maneuver has been initiated based on vehicle data that includes whether the drive train 14 is operated in a two-wheel drive mode or a four-wheel drive mode, a throttle position, a steering wheel angle, a steering wheel torque, and the yaw or side-slip of the vehicle 10. If control determines that a drift maneuver has not been initiated, control can loop back to decision block 502.

Returning to decision block 504, if control determines that a drift maneuver has been initiated, control can proceed to decision block 506 where control can determine if the yaw (or yaw error) of the vehicle exceeds a predetermined yaw (or yaw error) threshold. The predetermined yaw (or yaw error) threshold can be set to a desired amount, such as 30 degrees. If control determines that the yaw (or yaw error) exceeds the yaw (or yaw error) threshold, control can proceed to block 508.

In block 508, control controls the limited slip differential 50 to rotationally couple the first vehicle wheels to induce understeer. In this regard, the controller 16 controls the supply of electrical power to the annular coil 130 to operate the clutch 64 in the second condition as needed depending on amount of counter-steer that is provided by the vehicle operator. In a situation where the vehicle operator provides a relatively high amount of counter-steer, the limited slip differential 50 can be employed to saturate the inside one of the first vehicle wheels 40 to create additional yaw. In a situation where the vehicle operator provides a relatively low amount of counter-steer, the limited slip differential 50 can be employed to provide additional torque to the inside one of the first vehicle wheels 40 to effectively understeer the vehicle 10. Control can loop back to decision block 502.

Returning to decision block 506, if control determines that the yaw (or yaw error) does not exceed the yaw (or yaw error) threshold, control can proceed to block 510 to operate the clutch 64 of the limited slip differential 50 to transfer torque laterally between the first vehicle wheels 40 to reduce wheel slip and gain traction. It will be appreciated that the clutch 64 can be operated, either actually or effectively, in a condition between the first and second conditions to thereby vary the magnitude of the torque at which slipping occurs between the first and second friction plates 90 and 92 to a level that is intermediate those produced when the clutch 64 is operated at the first condition and the second condition. Control can loop back to decision block 502.

Returning to decision block 502, if control determines that the drift mode has not been activated, control proceeds to decision block 512. In decision block 512, control determines if an instability in the motion or path of the vehicle has been indicated. If control determines that a vehicle instability has been indicated, control can proceed to decision block 514.

In decision block 514, control can determine if the vehicle instability involves oversteer or understeer. If control determines that the vehicle instability involves oversteer, control can proceed to block 516 where control can operate the limited slip differential 50 to rotationally couple the first vehicle wheels to reduce oversteer (i.e., by inducing a situation that would otherwise create or cause understeer). In this regard, the controller 16 controls the supply of electrical power to the annular coil 130 to operate the clutch 64 in the second condition as needed depending on amount of counter-steer that is provided by the vehicle operator. Control can loop back to decision block 502.

Returning to decision block 514, if control determines that the vehicle instability involves understeer, control can proceed to block 518 where control can operate the clutch 64 of the limited slip differential 50 in the first condition to minimize the influence of the limited slip differential 50 on the understeer condition. Control can loop back to decision block 502.

Returning to decision block 512, if control determines that a vehicle instability has not been indicated, control can proceed to decision block 520 where control can determine if the vehicle 10 is traveling (or being steered) in a generally straight path. If control determines that the vehicle 10 is traveling in a generally straight path, the vehicle operator would not experience torque steer and as such, control proceeds to block 522 where control operates clutch 64 of the limited slip differential 50 in the first condition. Control can loop back to decision block 502.

Returning to decision block 520, if control determines that the vehicle is not traveling/being steered in a generally straight path, control can proceed to decision block 524, where control determines if a speed differential between the first vehicle wheels 40 (i.e., a lateral wheel speed differential of the first vehicle wheels 40) is greater than a predetermined speed differential threshold. If control determines that the speed differential between the first vehicle wheels 40 is not greater than the predetermined speed differential threshold, control can proceed to block 522. If, however, control determines that the speed differential between the first vehicle wheels 40 is greater than the predetermined speed differential threshold, control can proceed to decision block 526.

In decision block 526, control can determine if a speed of the vehicle 10 exceeds a predetermined vehicle speed threshold. The vehicle speed threshold can be set to a desired magnitude, such as 10 miles per hour. If control determines that the speed of the vehicle 10 is greater than the predetermined vehicle speed threshold, control can proceed to block 528.

In block 528, control can operate the clutch 64 of the limited slip differential 50 to transfer torque laterally between the first vehicle wheels 40 to reduce wheel slip, gain traction and mitigate torque steer. It will be appreciated that the clutch 64 can be operated, either actually or effectively, in a condition between the first and second conditions to thereby vary the magnitude of the torque at which slipping occurs between the first and second friction plates 90 and 92 to a level that is intermediate those produced when the clutch 64 is operated at the first condition and the second condition. Control can loop back to decision block 502.

Returning to decision block 526, if control determines that the speed of the vehicle 10 is not greater than the predetermined vehicle speed threshold, control can proceed to block 530 where control can operate the clutch 64 of the limited slip differential 50 to rotationally couple the first vehicle wheels 40 to increase traction and reduce torque-steer. In this regard, the controller 16 can control the supply of electrical power to the annular coil 130 to operate the clutch 64 in the second condition as needed to mitigate torque steer. Control can loop back to decision block 502.

It will be understood that the method steps, processes, and operations described above are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for mitigating torque steer in a vehicle having a steering axle, the steering axle having a limited slip differential and a pair of output members, the limited slip differential having a pair of differential outputs and a clutch, each of the differential outputs being coupled to a respective one of the output members for common rotation, the clutch being selectively operable between a first condition, which permits speed differentiation between the differential outputs to a predetermined maximum extent and inhibits speed differentiation between the differential outputs to a predetermined minimum extent, and a second condition, which permits speed differentiation between the differential outputs to a predetermined minimum extent and inhibits speed differentiation between the differential outputs to a predetermined maximum extent, the method comprising:
   operating the limited slip differential with the clutch in the first condition;
   determining that torque steer is occurring, wherein determining that torque steer is occurring comprises determining that the vehicle is being directed to travel in a line of travel that is not generally straight and determining a magnitude of a speed differential between rotational speeds of the differential outputs exceeds a second predetermined value;
   determining if a speed of the vehicle exceeds a predetermined vehicle speed threshold; and
   operating the clutch to mitigate the torque steer according to:
      operating the clutch in the first condition in response to the speed of the vehicle exceeding the predetermined vehicle speed threshold and the determination that torque steer is occurring; and
      operating the clutch in the second condition in response to the speed of the vehicle being less than the predetermined vehicle speed threshold and the determination that torque steer is occurring.

2. The method of claim 1, wherein determining that the line of travel is not generally straight comprises:
   determining a first parameter that is indicative of an input steering angle; and
   determining that the line of travel is not generally straight when a value of the first parameter is indicative that an absolute value of the input steering angle exceeds a first predetermined value.

3. The method of claim 1, further comprising:
   determining a value of a characteristic that is indicative of a yaw angle;
   determining that a drifting maneuver has been initiated; and
   operating the clutch in the second condition if the value of the characteristic indicates that an absolute value of the yaw angle exceeds a first predetermined yaw threshold and the drifting maneuver has been initiated, or otherwise operating the clutch in an intermediate condition if the value of the characteristic indicates that the absolute value of the yaw angle does not exceed the first predetermined yaw threshold, wherein the intermediate condition inhibits speed differentiation between the differential outputs to a predetermined first intermediate extent that is between the maximum and minimum extents to which speed differentiation is inhibited.

4. The method of claim 3, wherein the first predetermined yaw threshold is 30 degrees.

5. A vehicle comprising:
   a steering axle having a limited slip differential, the limited slip differential having a pair of differential outputs and a clutch, the clutch being selectively operable between a first condition, which permits speed differentiation between the differential outputs to a predetermined maximum extent and inhibits speed differentiation between the differential outputs to a predetermined minimum extent, and a second condition, which permits speed differentiation between the differential outputs to a predetermined minimum extent and inhibits speed differentiation between the differential outputs to a predetermined maximum extent; and a controller coupled to the clutch, the controller being configured to:
operate the clutch in the first condition;
determine that torque steer is occurring in response to a magnitude of a speed differential between rotational speeds of the differential outputs exceeding a predetermined value, and the vehicle not traveling in a straight path;
determine a speed of the vehicle;
operate the clutch in the second condition to mitigate the torque steer in response to determining that torque steer is occurring and the speed of the vehicle exceeds a predetermined vehicle speed; and
operate the clutch in the first condition in response to determining that torque steer is occurring and the speed of the vehicle is less than the predetermined vehicle speed.

6. The vehicle of claim 5, wherein the clutch is a friction clutch that couples one of the differential outputs to an input of the limited slip differential.

7. The vehicle of claim 5, wherein the differential outputs comprise side gears.

8. The vehicle of claim 7, wherein the limited slip differential includes a plurality of differential pinions, each of the differential pinions being engaged to the side gears.

9. The vehicle of claim 5, wherein the clutch includes a clutch actuator, the clutch actuator having an electromagnet and an armature, the electromagnet being selectively operable for generating a magnetic field for attracting the armature.

10. The vehicle of claim 9, wherein the clutch includes the clutch actuator and a clutch pack, the clutch actuator having a ball-ramp mechanism having a pair of ball-ramp rings, one of the ball-ramp rings being movable relative to the other one of the ball-ramp rings between a first axial position, and a second axial position, and wherein movement of the one of the ball-ramp rings relative to the other one of the ball-ramp rings from the first axial position toward the second axial position engages the clutch pack.

11. The vehicle of claim 5, wherein the controller is further configured to:
determine a value of a characteristic that is indicative of a yaw angle;
determine that a drifting maneuver has been initiated; and
operate the clutch in the second condition if the value of the characteristic indicates that an absolute value of the yaw angle exceeds a first predetermined yaw threshold and the drifting maneuver has been initiated, or otherwise operating the clutch in an intermediate condition if the value of the characteristic indicates that the absolute value of the yaw angle does not exceed the first predetermined yaw threshold, wherein the intermediate condition inhibits speed differentiation between the differential outputs to a predetermined first intermediate extent that is between the maximum and minimum extents to which speed differentiation is inhibited.

12. The vehicle of claim 11, wherein the first predetermined yaw threshold is 30 degrees.

13. A method for assisting a vehicle operator to perform a drifting maneuver in a vehicle, the vehicle having a steering axle, the steering axle having a limited slip differential and a pair of output members, the limited slip differential having a pair of differential outputs and a clutch, each of the differential outputs being coupled to a respective one of the output members for common rotation, the clutch being selectively operable between a first condition, which permits speed differentiation between the differential outputs to a predetermined maximum extent and inhibits speed differentiation between the differential outputs to a predetermined minimum extent, and a second condition, which permits speed differentiation between the differential outputs to a predetermined minimum extent and inhibits speed differentiation between the differential outputs to a predetermined maximum extent, the method comprising:
determining a value of a characteristic that is indicative of a yaw angle;
determining that the drifting maneuver has been initiated; and
operating the clutch in the second condition if the value of the characteristic indicates that an absolute value of the yaw angle exceeds a first predetermined threshold and the drifting maneuver has been initiated, or otherwise operating the clutch in an intermediate condition if the value of the characteristic indicates that the absolute value of the yaw angle does not exceed the first predetermined threshold, wherein the intermediate condition inhibits speed differentiation between the differential outputs to a predetermined first intermediate extent that is between the maximum and minimum extents to which speed differentiation is inhibited.

14. The method of claim 13, wherein the first predetermined threshold is 30 degrees.

* * * * *